(12) United States Patent
Choi et al.

(10) Patent No.: US 6,853,480 B2
(45) Date of Patent: Feb. 8, 2005

(54) OPTICAL AMPLIFIER

(75) Inventors: Yong Gyu Choi, Daejon-Shi (KR); Bong Je Park, Busan-Shi (KR); Hong Seok Seo, Daejon-Shi (KR); Doo Hee Cho, Daejon-Shi (KR); Kyong Hon Kim, Daejon-Shi (KR); Tae Hoon Lee, Daegu-Shi (KR); Jong Heo, Seoul (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 3 days.

(21) Appl. No.: 10/329,501

(22) Filed: Dec. 27, 2002

(65) Prior Publication Data

US 2004/0057105 A1 Mar. 25, 2004

(30) Foreign Application Priority Data

Sep. 24, 2002 (KR) .................. 10-2002-0057685

(51) Int. Cl.$^7$ ............................... H01S 3/00
(52) U.S. Cl. .................................. 359/341.5
(58) Field of Search ............. 359/341.3, 341.31, 359/343; 372/6, 40, 68, 70; 356/948, 949

(56) References Cited

U.S. PATENT DOCUMENTS

| | | | | |
|---|---|---|---|---|
| 3,786,365 | A | * | 1/1974 | Robinson et al. ............. 372/68 |
| 5,042,039 | A | | 8/1991 | Edagawa et al. |
| 5,341,237 | A | * | 8/1994 | Tohmon et al. .......... 359/341.5 |
| 5,432,806 | A | | 7/1995 | Snitzer |
| 5,861,981 | A | | 1/1999 | Jabr |
| 6,407,853 | B1 | | 6/2002 | Samson et al. |
| 6,413,891 | B1 | * | 7/2002 | Cho et al. ..................... 501/41 |
| 6,549,330 | B1 | * | 4/2003 | Choi et al. ................... 359/343 |
| 6,667,257 | B2 | * | 12/2003 | Cole et al. .................... 501/37 |
| 2001/0026654 | A1 | * | 10/2001 | Kasamatsu ..................... 385/2 |

OTHER PUBLICATIONS

Saissy et al, Journal of Lightwave Tech., vol. 9, # 11, PP 1467–1470, 11/91. Abstract only herewith.*
Funk et al, Electronics Letters, vol. 33, No. 23, PP 1958–1960, Nov. 6, 1997; Abstract only herewith.*
Carbonnier et al, Electronics Letters, vol. 34, No. 9, pp 893–894, Apr. 30, 1998; Abstract only herewith.*
Funk et al, IEEE Jour. Quantum Mechanics, vol. 37, No. 8, pp 980–992, 8/01; Abstract only herewith.*
Choi et al. Trivalent holmium–activated fluoride fiber for potential 1340/spl sim/1400nm optical amplifiers. OFC 2002. Mar. 17–22, 2002. pp. 462–463.*
M.C. Brierley, et al.; Lasting at 2:08 um and 1.38 um in a Holmium . . : Electronics Letters; Apr. 1998, vol. 24, No. 9, pp. 539–540.
D. S. Funk, et al.; Excitation Spectra of the Green . . ; IEEE Photonics Technology Letters.; Feb. 1993; vol. 5, No. 2, pp. 154–157.
X.X. Zhang, et al.; Ho3+ to Yb3+ back transfer and thermal . . ; Appl. Phys. Lett.; Nov. 1993; vol. 63, No. 19, pp. 2606–2607.
T. Schweizer, et al.; Infrared emission from holmium . . ; Infrared Physics & Technology; 40(1999) 329–335.

* cited by examiner

Primary Examiner—Mark Hellner
Assistant Examiner—Deandra M. Hughes
(74) Attorney, Agent, or Firm—Piper Rudnick LLP

(57) ABSTRACT

The present invention relates to a main wavelength band of a pump light source capable of improving the pump efficiency while using 1.6 $\mu$m fluorescence emitted from $Ho^{3+}$: $^5I_5 \rightarrow ^5I_7$ transition as an optical amplifier, and an assistant pump wavelength band capable of accomplishing population inversion between $^5I_5$ level and $^5I_7$ level to improve the signal gain characteristics of such amplifier. The optical amplifier using optical materials to which holmium or holmium and terbium, holmium and europium, holmium and neodymium or holmium and dysprosium, etc. are doped can be pumped using a light source that emits light of 11,200~11,500 $cm^{-1}$ or a light source that emits light of 6,000~6,500 $cm^{-1}$.

6 Claims, 8 Drawing Sheets

OPTICAL AMPLIFIER

BACKGROUND OF THE INVENTION

1. Field of the Invention

The invention relates generally to an optical amplifier, and more particularly to, an optical amplifier to which holmium is doped.

2. Description of the Prior Art

In order to utilize the entire range of 1200~1700 nm being a low-loss wavelength region of a silica optical fiber for transmission, it is inevitably required that a wide-band optical amplifier be developed. An ion doped optical fiber amplifier that operates at a 1300 nm band, a 1450 nm band and a 1530~1610 nm band has been developed so far. It was found that fluorescence of 1620~1690 nm band is emitted from a holmium (Ho) doped amorphous material. However, an example implementing a laser or am amplifier of any type using it has not yet been reported. (Reference: T. Schweizer, B. N. Samson, J. R. Hector, W. S. Brocklesby, D. W. Hewak, D. N. Payne, "Infrared Emission from Holmium Doped Gallium Lanthanum Sulfide Glass" Infrared Physics & Technology Vol. 40, (1999) pp. 329–335).

Fluorescence of the 1620~1690 nm band is generated from $Ho^{3+}:^5I_5 \rightarrow ^5I_7$ transition. The $^5I_5$ level being an upper level is approximately located at a 900 nm band. If it is pumped in this wavelength, however, excited state absorption of the pump is caused to excite holmium ions to the $^5F_1$ level. Thus, in order to increase the excitation efficiency of 1620~1690 nm fluorescence, it is required that the wavelength in which the excited state absorption of the pump light is generated be omitted. (Reference: Y. G. Choi, B. J. Park, K. H. Kim, "$Ho^{3+}: (^5S_2, ^5F_4) \rightarrow ^5I_5$ Transition in Fluoride Glasses", Chemical Physics Letters, vol. 354, (2002) pp. 69–74).

Further, as the fluorescence lifetime of the $^5I_7$ level being a lower level is longer than that of the upper level, inversion of the population between the two levels is difficult. This degrades the operating characteristics of the laser or the amplifier. Therefore, a method of efficiently accomplishing inversion of the population between the two levels must be found. The depopulation rate could be faster by forming a cavity utilizing a corresponding lower level as a lasing level in order to lower the population density of the lower level. For example, there is a previous experimental result example that in order to implement a laser using the $Ho^{3+}: ^5I_5 \rightarrow ^5I_6$ transition, lasing was achieved at a 1.2 μm wavelength band corresponding to the energy between the $^5I_6$ level and the $^5I_8$ level being the ground level, so that inversion of the population between the $^5I_5$ level and the $^5I_6$ level could be accomplished (Reference: J. Schneider, C. Carbonnier, U. B. Unrau, "Characterization of a $Ho^{3+}$-Added Fluoride Fiber Laser with a 3.9-μm Emission Wavelength", Applied Optics, vol. 36, no. 33, (1997) pp. 8595–8600). Therefore, in case of 1.6 μm fluorescence of holmium, lasing may be caused at a 2.0 μm wavelength band corresponding to the energy between the $^5I_7$ level and the ground $^5I_8$ level.

SUMMARY OF THE INVENTION

The present invention is contrived to solve the above problems and an object of the present invention is to provide an optical amplifier using 1.6 μm fluorescence emitted from holmium ions embedded in an optical fiber or a planar waveguide.

In order to accomplish the above object, the optical amplifier according to the present invention, is characterized in that it comprises an optical material having a core containing holmium and a clad, and a pumping means optically connected to the optical material, for illuminating a pump light to the optical material, wherein the pumping means includes both or one of an light source for emitting light of a wavelength band of 11,200~11,500 $cm^{-1}$ and an light source for emitting light of a wavelength band of 6,000~6,500 $cm^{-1}$.

In concrete, the optical amplifier of the present invention comprises an optical material having a core containing holmium and a clad so that an optical signal to be amplified is transmitted, a pumping means optically connected to the optical material, for illuminating a pump light to the optical material, an input means for inputting a signal to the optical material, a WDM coupler for combining an incident signal light and the pump light from the input means and the pumping means, respectively, to transfer the combined light to the optical material, and an output means for receiving the optical signal that is amplified by the optical material, wherein the pumping means includes both or one of an light source for emitting light of a wavelength band of 11,200~11, 500 $cm^{-1}$ and an light source for emitting light of a wavelength band of 6,000~6,500 $cm^{-1}$.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
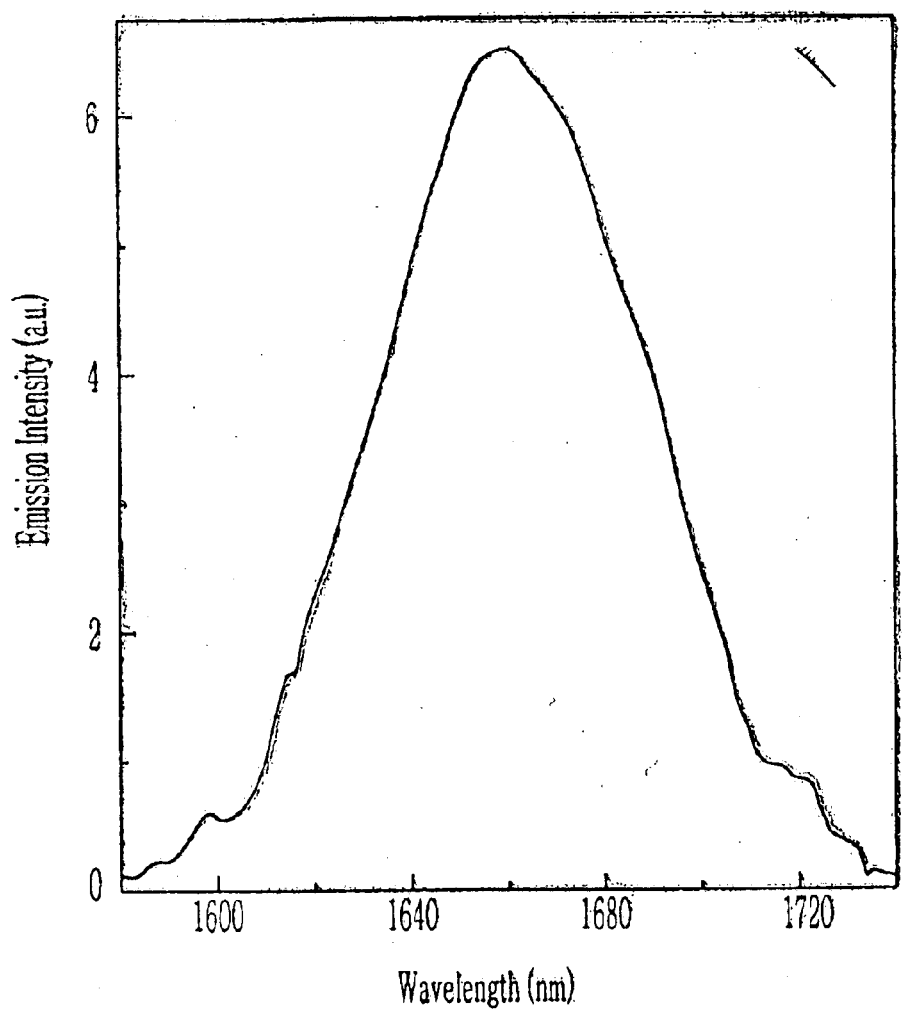
FIG. 1 is a graph illustrating a 1.6 μm fluorescence emission spectrum of holmium doped fluoride glass.

The present invention will be described in detail by way of a preferred embodiment with reference to accompanying drawings.

In order to implement a rare-earth ion doped optical amplifier that allows amplification of a 1.6 μm band optical signal, the rare-earth ion that emits fluorescence at a corresponding band must be first selected. It is first required to understand on the fluorescence characteristics when this active ion dopes a solid dielectric medium. The central wavelength of $^5I_5 \rightarrow {}^5I_7$ transition in a typical trivalent holmium doped optical material is 1660 nm. Meanwhile, as energy discrepancy between the fluorescing $^5I_5$ level and the next-lower-lying $^5I_6$ level is relatively small, about 2700 cm$^{-1}$, a nonradiative transition rate due to multiphonon relaxation is increased and as a result the fluorescence lifetime becomes low. It is thus required that a representative phonon energy of the optical material be small. Silica glass being a representative optical material for the optical fiber amplifier serves to lower the quantum efficiency of corresponding fluorescence. As a result, it is necessary to use fluoride glass or silicate glass having a lower phonon energy than silica as a host material. As the $^5I_5$ level being the upper level from which fluorescence of 1650 nm band is emitted is approximately located at 870~920 nm, it is required that a wavelength of a pumping light source basically belongs to a corresponding absorption band. However, in case that it is actually applied to the conventional amplifier, it is required that induced emission cross section be small while absorption cross section be large at the optical pumping wavelength, and there be no excited state absorption of the pump light. Therefore, the optical pump wavelength must be determined to minimize the energy of the pump light source that would be lost in a nonradiative way.

Meanwhile, as the fluorescence lifetime of the fluorescence-terminating $^5I_7$ level is longer than that of the upper level, population inversion between the two levels is difficult. In order to solve this problem, a method by which the fluorescence lifetime of the lower level is reduced through nonradiative energy transfer is used. In this case, if rare-earth ions such as terbium (Tb), europium (Eu), dysprosium (Dy), neodymium (Nd), or the like are commonly doped, the energy is transferred from the lower level to these ions. As a result, the fluorescence lifetime of the lower level is reduced. Another method is to use excited state absorption. In other words, holmium ion excited to the lower level is again excited to a higher level in order to lower the population density of the corresponding level. In this case, it is important to set the wavelength band at which excited state absorption is effectively generated from the $^5I_7$ level.

An optimal pump wavelength band at which the excitation efficiency of the optical amplifier using $^5I_5 \rightarrow {}^5I_7$ transition of holmium can be maximized will be described by reference to several embodiments.

A spectrum measured from fluoride glass as a representative example of fluorescent emission spectrum originated from $^5I_5 \rightarrow {}^5I_7$ transition of holmium is shown in FIG. 1. In case of fluoride glass, the peak wavelength of fluorescence is about 1660 nm, full-width at half maximum (FWHM) is about 65 nm, the induced emission cross section is about $5.4 \times 10^{-21}$ cm$^2$ and the branching ratio is about 55%. In case of sulfide glass, there is no significant change in the fluorescence emission spectrum, the induced emission cross section has a higher value than that at fluoride glass. Meanwhile, the fluorescence lifetime is about 230 μs in case of ZBLAN (ZrF$_4$—BaF$_2$—LaF$_3$—AlF$_3$—NaF) fluoride glass and 1300 μs in case of Ge—Ga—As—S sulfide glass. The reason why the fluorescence lifetime of fluoride glass is smaller than sulfide glass even though the refractive index of fluoride glass is smaller than sulfide glass, is that the nonradiative multiphonon relaxation rate is large since the phonon energy of fluoride glass (about 500 cm$^{-1}$) is smaller than that of sulfide glass (about 350 cm$^{-1}$). Even so, the fluorescence lifetime in fluoride glass is larger than typical lifetime of about 100 μs for 1.3 μm fluorescence that is emitted from Pr$^{3+}$ doped fluoride glass. (Reference: D. R. Simons, A. J. Faber, H. de Waal, "Pr$^{3+}$-added GeS$_x$-based Glasses for Fiber Amplifiers at 1.3 μm", Optics Letters, vol. 20, no. 5, (1995) pp. 468–470).

Figure 2:
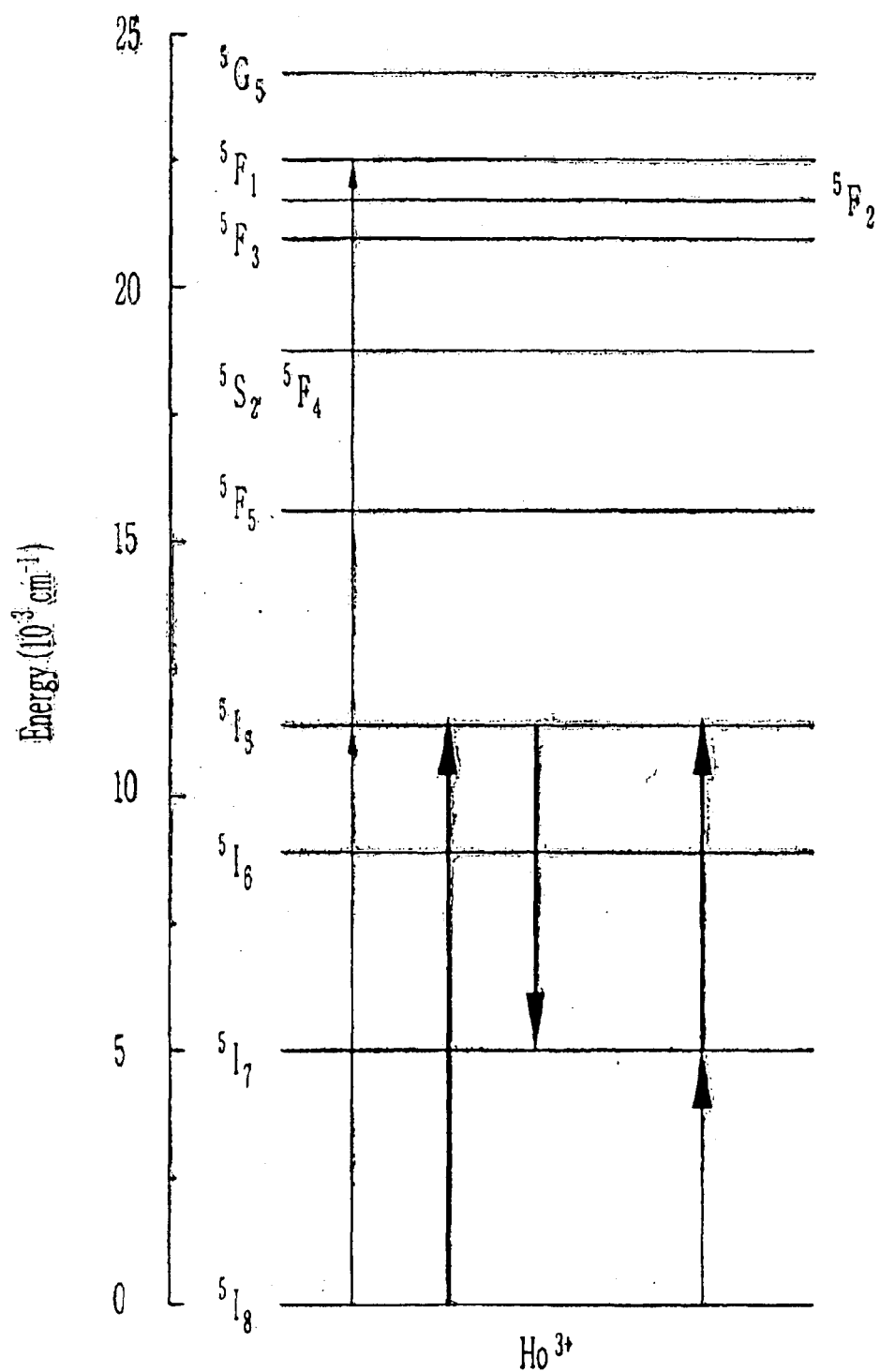
FIG. 2 shows an energy level diagram within 4f configuration of trivalent holmium ion in an optical material.

Meanwhile, the branching ratio represents a relatively high value, about 55%. Therefore, the amplifier using this fluorescence has a good gain characteristic. It is thus very important to decide an effective pump wavelength. As described above, the pump wavelength should be selected to minimize the excited state absorption of the pump light. The energy level of a 4f configuration of trivalent holmium ions is shown in FIG. 2, which shows transition relating to the present invention. From FIG. 2, it can be seen that the wavelength band representing excited state absorption of the pump light and the absorption wavelength band of the $^5I_5$ level are overlapped. If care is not taken to set wavelength of the pump light source, a sizable amount of the energy may be lost due to the excited state absorption.

A process of deciding an optimal pump wavelength at which there is no excited state absorption of the pump will be described below by reference to embodiments.

[Embodiment 1]

Figure 3:
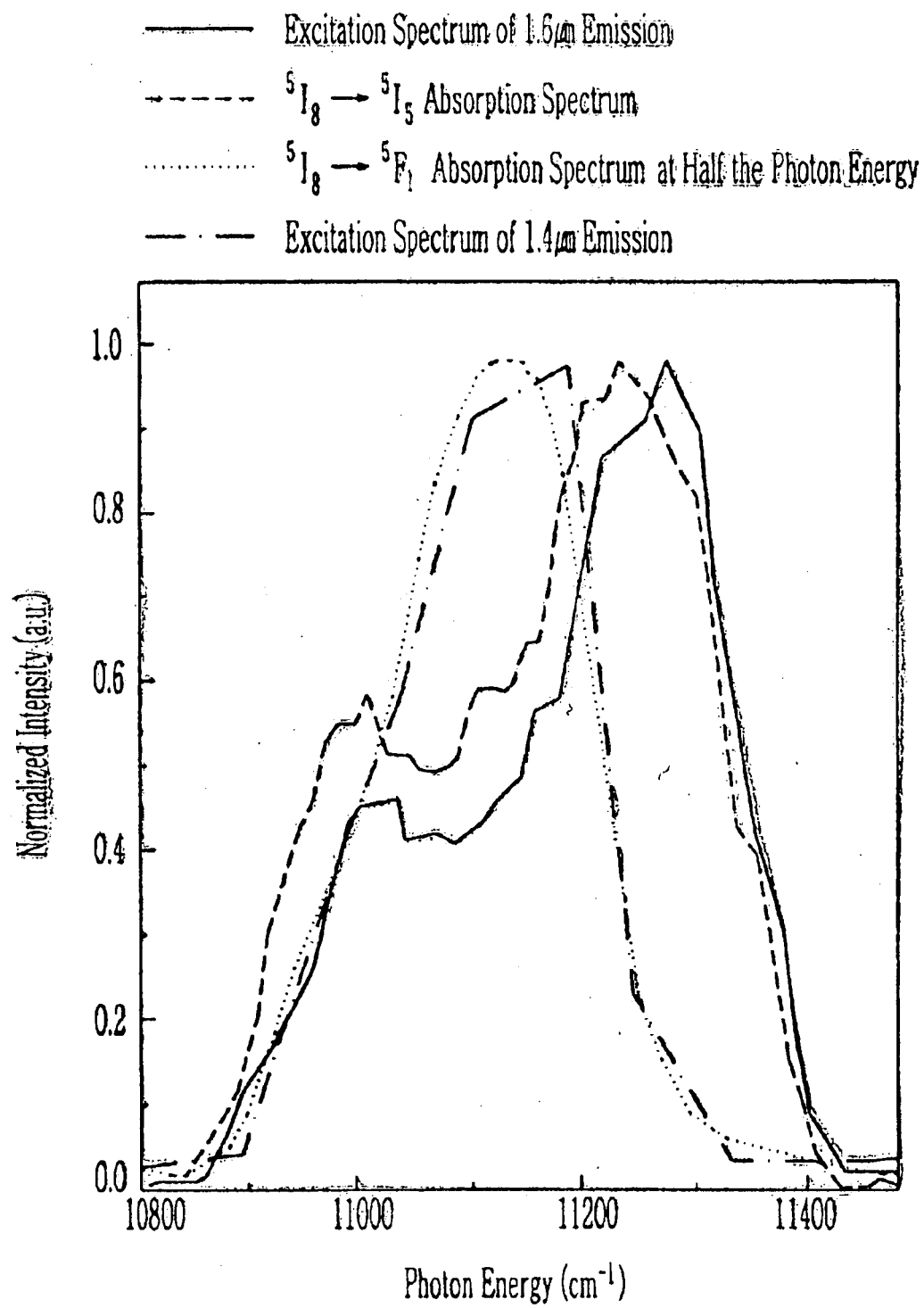
FIG. 3 is a graph illustrating absorption and excitation spectrum of holmium doped fluoride glass.

A heavy metal fluoride (ZrF$_4$—BaF$_2$—LaF$_3$—AlF$_3$—NaF) glass sample single-doped with 0.1 mol % holmium was fabricated. It was determined whether upconversion of the excitation light is generated. For this, the excitation spectrum against the green fluorescence of about 530 nm band generated from $(^5S_2, {}^5F_4) \rightarrow {}^5I_8$ transition was measured. A result of comparing the excitation spectrum with the lineshape of the absorption spectrum of $^5F_1$ level is shown in FIG. 3. From FIG. 3, it could be seen that the excited state absorption spectrum almost completely match to, in lineshape, the absorption spectrum of $^5F_1$ level drawn at half the original energies. What can also be seen from FIG. 3 is the spectrum of ground state absorption to $^5I_5$ level, which extends over a wider energy than the excited state absorption spectrum. In other words, the excited state absorption spectrum differs from the ground state absorption spectrum. In concrete, the wavelengths where the excited state absorption occur is irrelevant to the wavelengths of the ground state absorption, and depend on the wavelengths of $^5I_8 \rightarrow {}^5F_1$ absorption. In order to confirm this, a result of measuring the excitation spectrum of 1.6 μm fluorescence is also shown in FIG. 3. After comparing the measured result with the absorption spectrum of $^5I_5$ level, it could be seen that both the spectrums match each other at wavelengths where the excited state absorption is absent, but the excitation spectrum of 1.6 μm fluorescence is smaller than the absorption spectrum of $^5I_5$ level at wavelengths where the excited state absorption is evident. In other words, in case that there is no excited state absorption, the lineshape of the excitation spectrum would be identical to that of the ground state absorption spectrum. If excited state absorption intervenes, however, the pump efficiency of 1.6 μm fluorescence is degraded since some of the energy accumulated at the $^5I_5$ level are lost to an unnecessary energy level. Therefore, the optimal pump wavelength band where the excited state absorption is excluded is 11,200~11,500 cm$^{-1}$ in case of fluoride glass.

In the above description, the pump wavelength band at which the pump efficiency of 1.6 μm fluorescence is maximized in case of fluoride glass was described. An embodiment in which the optimal pump wavelength is selected by comparing the absorption spectrum and the excitation spectrum of sulfide glass having the phonon energy smaller than fluoride glass and having a long fluorescence lifetime of 1.6 µm emission will be described below.

[Embodiment 2]

Figure 4:
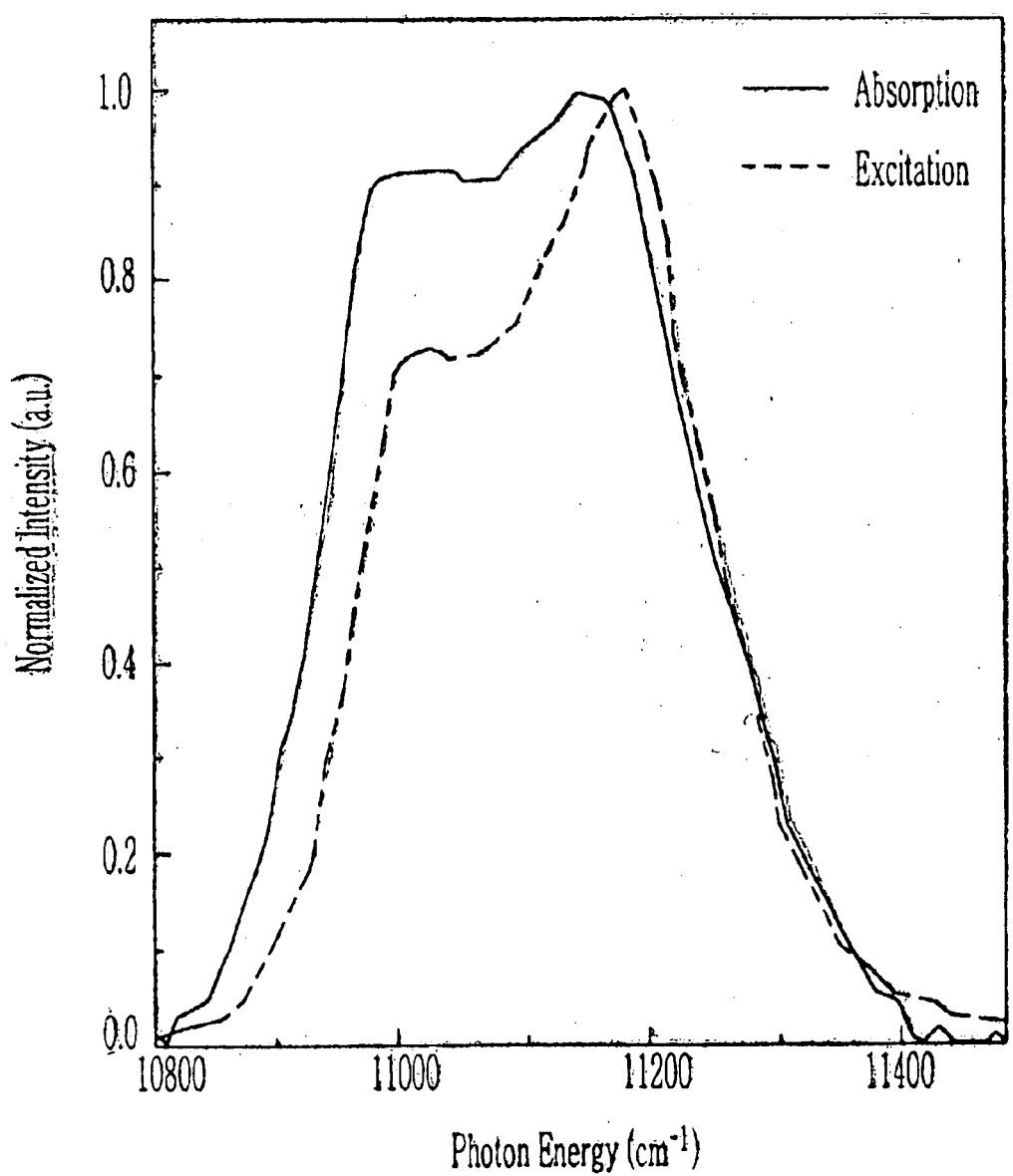
FIG. 4 is a graph illustrating absorption and excitation spectrum of holmium doped sulfide glass.

A 0.08 mol % holmium-doped sulfide glass sample out of Ge—Ga—As—S series was fabricated. A result of measuring the ground state absorption spectrum and the excitation spectrum of 1.6 µm fluorescence is shown in FIG. 4. From FIG. 4, it can be seen that the excitation spectrum and the ground state absorption spectrum match each other at a specific wavelength band, as in case of fluoride glass, and the excited state absorption is not generated at this band. The wavelength band is 11,200~11,500 cm$^{-1}$. This wavelength band has basically no difference from the band that was measured for fluoride glass, because 4f configuration of a lanthanide ion is less affected by crystal field due to a shielding effect of external 5d and 6s configurations. In other words, even though a host composition is significantly changed, there is no conspicuous change in the absorption wavelengths of a rare-earth ion. As a result, the optimal pump wavelength band that was determined from the above embodiments using the fluoride glass and sulfide glass samples can be applied to typical optical materials. The optimal pump wavelength band proposed by the present invention has an advantage that it can accommodate the wavelengths of a commercialized high-power laser diode.

Meanwhile, an embodiment for solving a problem that population inversion is difficult since the fluorescence lifetime of the lower $^5I_7$ level at which the 1.6 µm fluorescence ends is longer than the upper $^5I_5$ level, will be described below.

[Embodiment 3]

Figure 5:
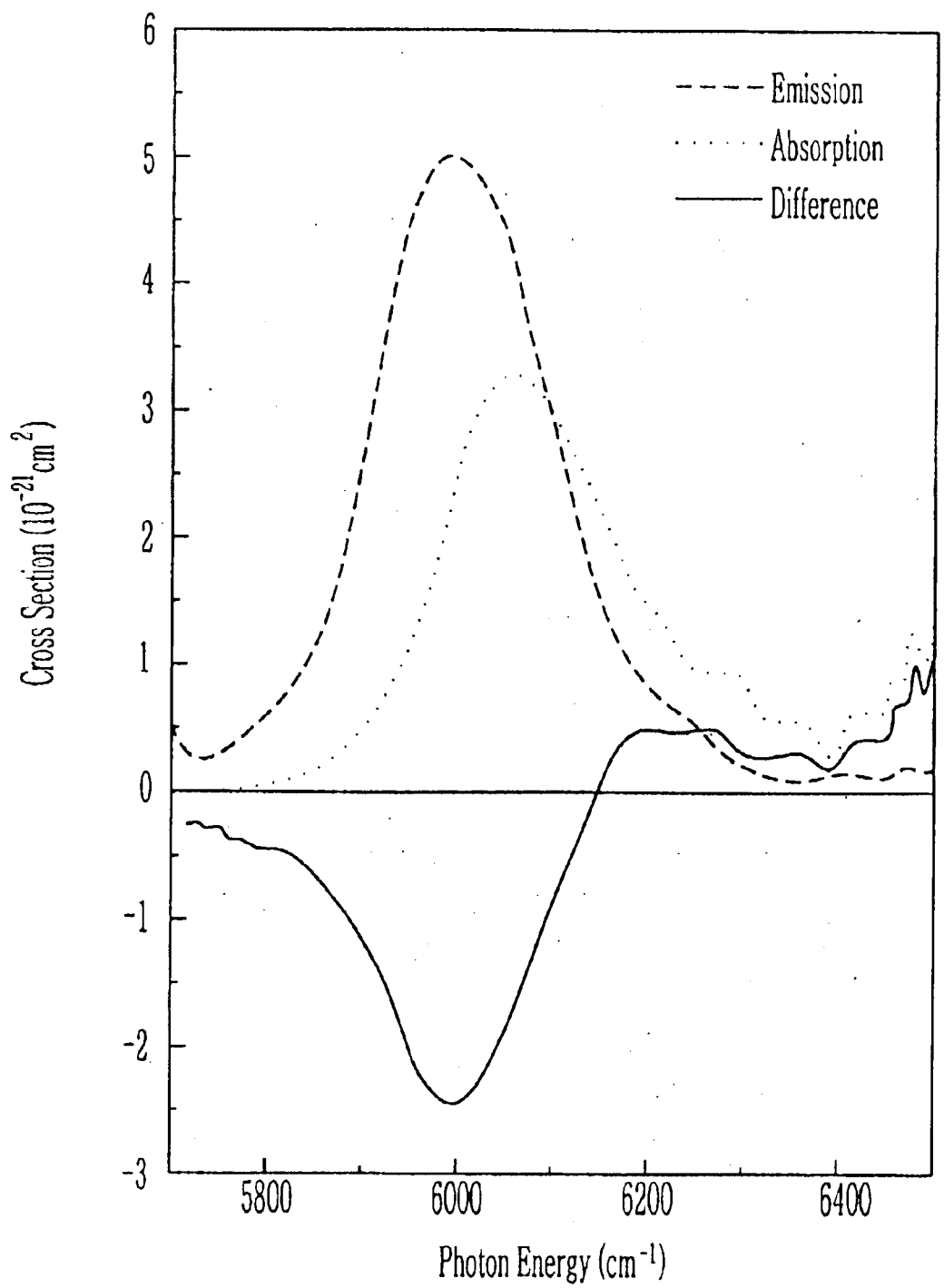
FIG. 5 is a graph illustrating emission cross section and excited state absorption cross section of holmium doped fluoride glass.

An emission cross-section spectrum of $^5I_5 \rightarrow {}^5I_7$ transition measured from the holmium-doped fluoride glass sample and the excited state absorption spectrum of from $^5I_7 \rightarrow {}^5I_5$ transition are shown in FIG. 5. FIG. 5 shows a representative absorption-emission relationship in that the peak wavelength of absorption transition is shorter than that of emission transition. FIG. 5 also shows the difference spectrum between the absorption and emission cross-sections and it can be seen that the absorption events dominates the emission events at the shorter wavelength side. In other words, if holmium is pumped again with the energy of over 6,000 cm$^{-1}$, the auxiliary pump will depopulate the $^5I_7$ level and as a result cause population inversion between two energy levels. In particular, holmium can be excited from the lower level to the $^5I_5$ level due to the pump excited state absorption at 6,000~6,500 cm$^{-1}$.

[Embodiment 4]

Figure 6:
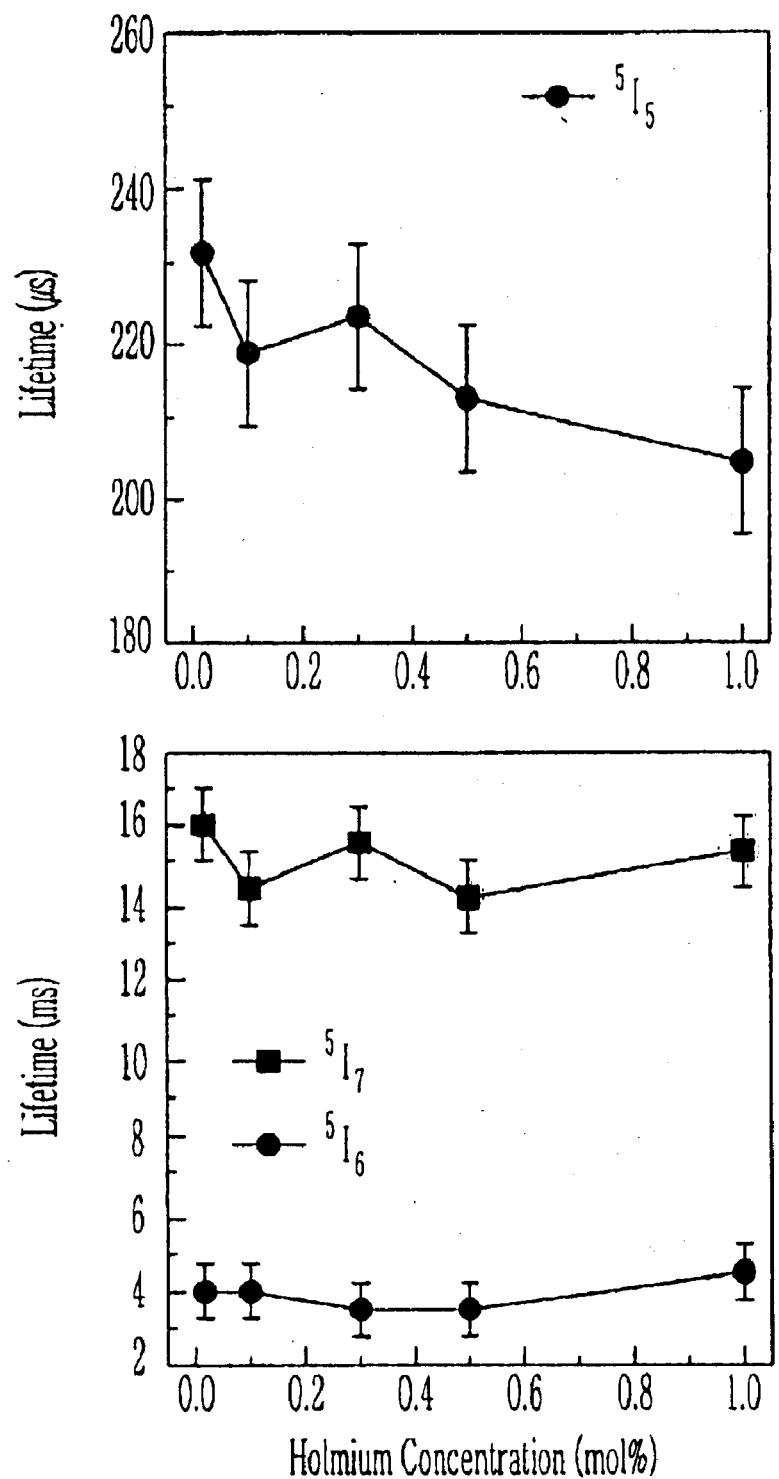
FIG. 6 is a graph illustrating the fluorescence lifetimes of $^5I_5$, $^5I_6$ and $^5I_7$ levels of holmium-single-doped fluoride glass.

In order to minimize degradation in the efficiency of a laser and an amplifier that is caused since the lifetime of the $^5I_5$ level is shorter than that of the lower-lying $^5I_6$ and $^5I_7$ levels, it is required that the lifetimes of the $^5I_6$ level and the $^5I_7$ level be reduced. As shown in FIG. 6, when holmium is singly doped, lifetime of the upper $^5I_5$ level is significantly shorter than the lower levels, as described above.

Figure 7:
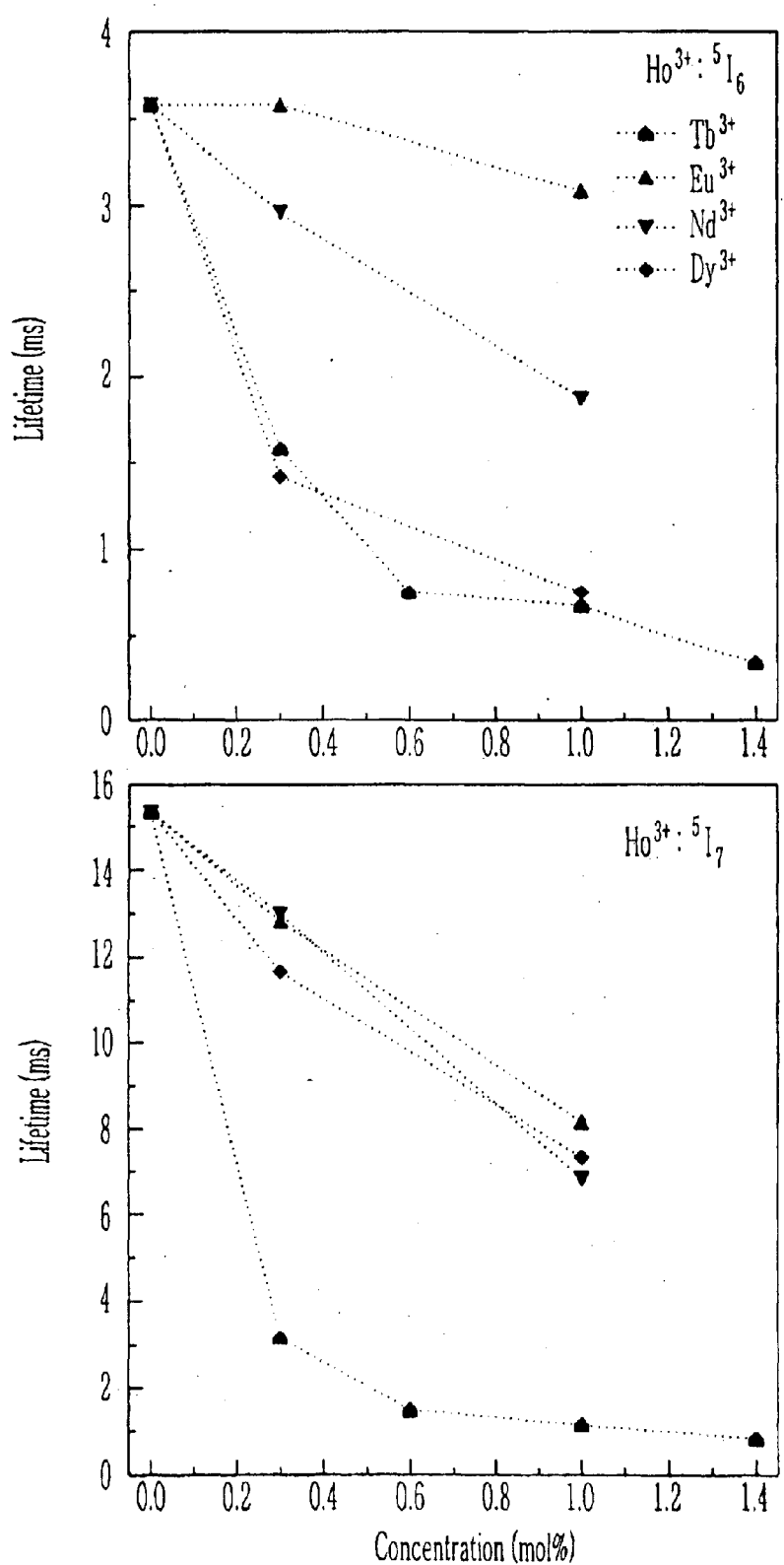
FIG. 7 is a graph illustrating the fluorescence lifetimes of $^5I_6$ and $^5I_7$ levels of holmium-containing fluoride glasses codoped with a lanthanide out of terbium (Tb), europium (Eu), dysprosium (Dy) and neodymium (Nd)

In the present embodiment, fluoride glass samples to which one rare-earth out of terbium, neodymium, europium and dysprosium is doped was fabricated under the condition that the holmium concentration is set to 0.3 mol % and the codoping concentration of terbium, neodymium, europium and dysprosium are changed, and the fluorescence lifetime of each of the levels were then measured. From FIG. 7, it can be seen that each of the doped terbium, neodymium, europium and dysprosium ions serves to reduce abruptly the lifetime of the $^5I_6$ level and the $^5I_7$ level. This is due to the nonradiative energy transfer between the $^5I_6$ level and the $^5I_7$ level of holmium and the doped terbium, neodymium, europium and dysprosium ions. This energy transfer depends on the absorption spectrum, the doping concentration, etc. of each of the codoped ions. Therefore, the lifetime of the $^5I_6$ level and the $^5I_7$ level of holmium is significantly reduced as the addition amount of the codoped ions increases. Meanwhile, it is preferred that this codoping does not significantly affect the lifetime of the $^5I_5$ level of holmium.

Figure 8:
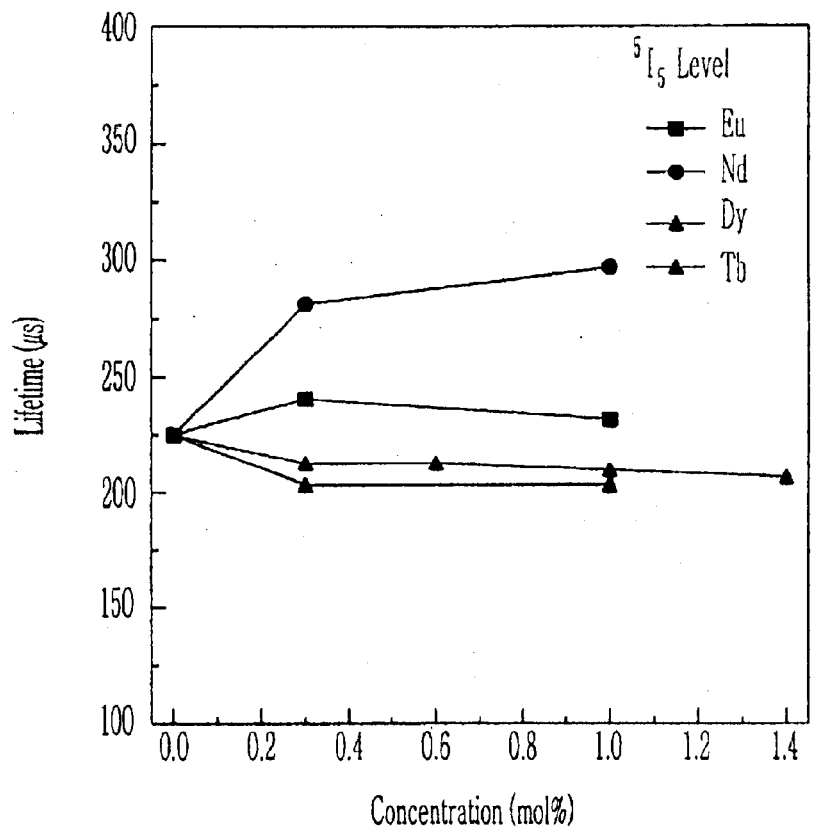
FIG. 8 is a graph illustrating the fluorescence lifetimes of $^5I_5$ level of holmium-containing fluoride glasses codoped with a lanthanide out of terbium (Tb), europium (Eu), dysprosium (Dy) and neodymium (Nd)

From FIG. 8, it can be understood that the codoped terbium, neodymium, europium and dysprosium rarely affect the lifetime of the $^5I_5$ level. As a result, the codoped materials proposed by the present embodiment contribute population inversion between the upper level and the lower level by effectively making depopulation rate of only the lower levels much faster.

Figure 9:
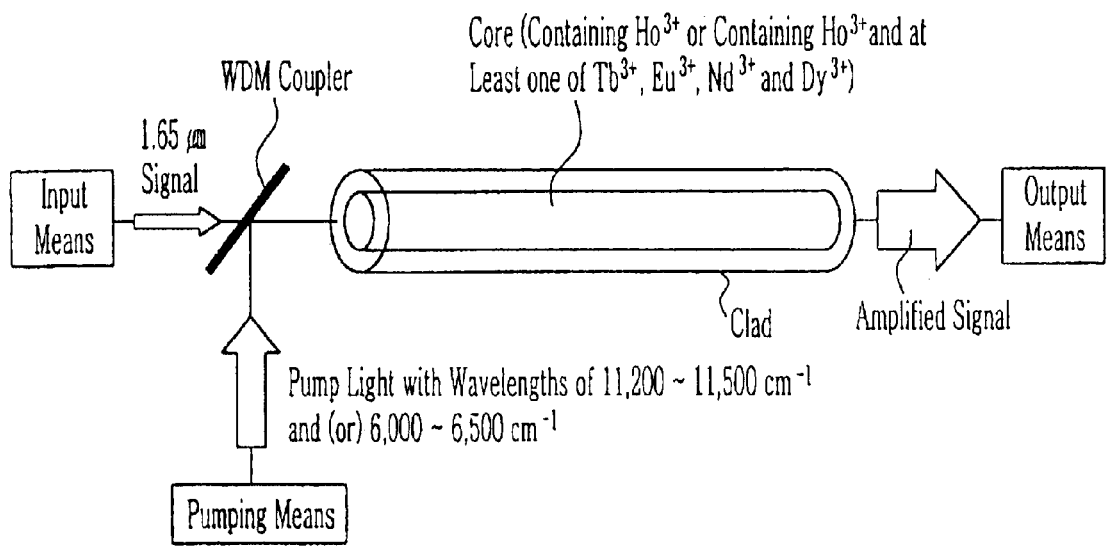
FIG. 9 shows an example of a holmium doped optical amplifier according to a preferred embodiment of the present invention.

FIG. 9 shows a structure of a holmium doped optical amplifier according to a preferred embodiment of the present invention.

The optical amplifier includes an optical material having a core and a clad for transmitting an optical signal to be amplified, a pumping means optically connected to the optical material for launching a pump light to the optical material, an input means for inputting a signal to the optical material, a wavelength division multiplexing (WDM) coupler for combining the incident signal light from the input means and the pump light from the pumping means to transfer the combined light to the optical material, and an output means for receiving the optical signal amplified by the optical material.

The core of the optical material contains holmium and may also include at least one or more of terbium, europium, neodymium and dysprosium along with holmium. The pumping means includes both or one of a light source with a emission wavelength band of 11,200~11,500 cm$^{-1}$ and a light source with a emission wavelength band of 6,000~6,500 cm$^{-1}$. The optical material is an optical fiber made of a fluoride material, a sulfide material or a silicate material.

When the energy of the pump light is 11,200~11,500 cm$^{-1}$ through the embodiments 1 and 2, it was described that holmium at the ground level could be effectively excited to the $^5I_5$ level without any of the excited state absorption of the pump light. The pump light source having the energy of a range proposed by the present invention can be independently used when population inversion between the $^5I_5$ level and the $^5I_7$ level is accomplished by codoping the rare-earth ion such as terbium, europium, neodymium, dysprosium, or the like, or by forming a laser cavity between the ground level and the $^5I_7$ level. However, in case that the effects of the two methods above are to be further improved or that holmium is doped singly to the optical material, the light source with emission wavelengths set through the embodiment 3 as an assistant pump light source can be used. Meanwhile, as another embodiment, the auxiliary light source in the range of 6,000~6,500 cm$^{-1}$ determined through the embodiment 3 can not only accomplish population inversion between the $^5I_5$ level and the $^5I_7$ level, but also induce emission of 1.6 µm fluorescence by exciting holmium at the ground level to the $^5I_5$ level through the excited state absorption of the pump light.

As mentioned above, according to the present invention, in case that 1.6 µm fluorescence emitted from Ho$^{3+}$: $^5I_5 \rightarrow {}^5I_7$ transition is used as the optical amplifier, a main wavelength band of the pumping light source that can improve the pump efficiency and an auxiliary pump wavelength band that can accomplish the population inversion between the $^5I_5$ level and the $^5I_7$ level were described. This assistant pump wavelength band can sever as an upconversion pumping band as well. In this case, the pump light source having the energy of 6,000~6,500 cm$^{-1}$ can be independently used. In summary, the optical amplifier utilizing the 1.6 μm fluorescence band of trivalent holmium can effectively operate using the pump light sources of the following three types:

1) If a pump light source of 11,200~11,500 cm$^{-1}$ is independently used, the pump efficiency can be improved by preventing the excited state absorption to a $^5F_1$ level.

2) A pump light of 11,200~11,500 cm$^{-1}$ is used as a main light source and another light source emitting light of 6,000~6,500 cm$^{-1}$ is simultaneously used as an assistant pump. In this case, the signal gain of the amplifier can be improved by achieving the population inversion between the $^5I_5$ level and the $^5I_7$ level.

3) A pump light source of 6,000~6,500 cm$^{-1}$ can be independently used as upconversion pumping scheme. In this case, holmium can be excited to the $^5I_5$ level and the population inversion between the $^5I_5$ level and the $^5I_7$ level can be accomplished as well. In this case, however, the pump efficiency would be lower than a case where a light source of 11,200~11,500 cm$^{-1}$ is used.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. An optical amplifier, comprising:

an optical material having a core containing holmium for amplifying an optical signal of 1.6 μm hand and a clad; and a pumping means having a first light source for pumping light of a wavelength band of 11,200~11,500 cm$^{-1}$ and a second light source for pumping light of a wavelength band of 6,000~6,500 cm$^{-1}$, wherein an input optical signal of 1.6 μm band is amplified in the optical material by pumped light from both or one of the first light source and the second light source.

2. The optical amplifier as claimed in claim 1, wherein the core further contains at least one or more of terbium, europium, neodymium and dysprosium, so that population inversion between an upper energy level and lower energy level of trivalent holmium is accomplished.

3. The optical amplifier as claimed in claim 1, wherein the optical material is an optical fiber made of a fluoride material, a sulfide material or a silicate material.

4. An optical amplifier, comprising:

an optical material having a core containing holmium for amplifying an optical signal of 1.6 μm band and a clad;

a pumping means having a first light source for pumping light of a wavelength band of 11,200~11,500 cm$^{-1}$ and a second light source for pumping light of a wavelength band of 6,000~6,500 cm$^{-1}$;

an input means for inputting an input optical signal of 1.6 μm band to the optical material;

a WDM coupler for combining the input optical signal from the input means and pumped light from both or one of the first light source and the second light source to transfer the combined light to the optical material; and an output means for receiving the optical signal amplified in the optical material.

5. The optical amplifier as claimed in claim 4, wherein the core further contains at least one or more of terbium, europium, neodymium and dysprosium, so that population inversion between an upper energy level and lower energy level of trivalent holmium is accomplished.

6. The optical amplifier as claimed in claim 4, wherein the optical material is an optical fiber made of a fluoride material, a sulfide material or a silicate material.

* * * * *